United States Patent
Albrecht et al.

(10) Patent No.: US 7,969,686 B2
(45) Date of Patent: Jun. 28, 2011

(54) SELF-ASSEMBLY STRUCTURES USED FOR FABRICATING PATTERNED MAGNETIC MEDIA

(75) Inventors: Thomas R. Albrecht, San Jose, CA (US); Xiao Z. Wu, San Jose, CA (US); Henry Hung Yang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 798 days.

(21) Appl. No.: 11/964,680

(22) Filed: Dec. 26, 2007

(65) Prior Publication Data
US 2009/0166321 A1 Jul. 2, 2009

(51) Int. Cl.
*G11B 5/82* (2006.01)
(52) U.S. Cl. .................................... 360/135; 360/77.08
(58) Field of Classification Search .................. None
See application file for complete search history.

(56) References Cited

U.S. PATENT DOCUMENTS

| | | | |
|---|---|---|---|
| 5,745,978 A * | 5/1998 | Aboaf et al. | 29/603.08 |
| 6,420,058 B1 | 7/2002 | Haratani et al. | |
| 6,421,195 B1 | 7/2002 | Rubin et al. | |
| 6,566,665 B2 | 5/2003 | Baglin et al. | |
| 6,643,082 B1 | 11/2003 | Belser | |
| 6,753,043 B1 | 6/2004 | Kuo et al. | |
| 7,009,791 B2 | 3/2006 | Shimatani | |
| 7,153,597 B2 | 12/2006 | Yang et al. | |
| 7,164,548 B2 | 1/2007 | Hattori et al. | |
| 7,352,529 B2 * | 4/2008 | Hibi et al. | 360/135 |
| 7,423,842 B2 * | 9/2008 | Fujita et al. | 360/135 |
| 7,474,506 B2 * | 1/2009 | Soeno et al. | 360/135 |
| 2002/0168548 A1 | 11/2002 | Sakurai et al. | |
| 2005/0094298 A1 | 5/2005 | Sakurai et al. | |
| 2006/0222898 A1 | 10/2006 | Ichihara | |
| 2006/0289382 A1 | 12/2006 | Kikitsu et al. | |
| 2006/0291271 A1 | 12/2006 | Stark et al. | |

FOREIGN PATENT DOCUMENTS

| | | |
|---|---|---|
| JP | 8339649 | 12/1996 |
| JP | 2001189014 | 7/2001 |
| JP | 2004062920 | 2/2004 |
| JP | 2004303302 | 10/2004 |
| JP | 2005293662 | 10/2005 |
| WO | 2005093721 | 6/2005 |

OTHER PUBLICATIONS

Sun et al., "Self Assembling Magnetic Nanomaterials", J. Mag. Soc. Japan, vol. 25, No. 8, pp. 1434-1440 (2001).
Terris et al. "Nanofabricated and self-assembled magnetic structures as data storage media", Journal of Physics D: Applied Physics 38, R199-R203 (2005).

* cited by examiner

*Primary Examiner* — Duy-Vu N Deo
(74) *Attorney, Agent, or Firm* — Duft Bornsen & Fishman, LLP

(57) ABSTRACT

Methods of defining servo patterns and data patterns for forming patterned magnetic media are described. For one method, a lithographic process is performed to define a servo pattern in servo regions on a substrate. The lithographic process also defines a first data pattern in data regions of the substrate. The first data pattern is then transferred to (i.e., etched into) the data regions. Self-assembly structures are then formed on the data pattern in the data regions to define a second data pattern. The servo pattern is then transferred to the servo regions and the second data pattern is transferred to the data regions. Thus, the servo pattern is defined through lithographic processes while the data pattern is defined by a combination of lithographic processes and self-assembly.

19 Claims, 11 Drawing Sheets

SELF-ASSEMBLY STRUCTURES USED FOR FABRICATING PATTERNED MAGNETIC MEDIA

BACKGROUND OF THE INVENTION

1. Field of the Invention

The invention is related to the field of magnetic disk drive systems and, in particular, to fabricating patterned magnetic media. More particularly, a lithographic process is used to form a servo pattern and a data pattern for a patterned magnetic media. Self-assembly structures are then built on the data pattern to further refine this pattern, but are not built on the servo pattern.

2. Statement of the Problem

Many computer systems use magnetic disk drives for mass storage of information. Magnetic disk drives typically include one or more magnetic recording heads (sometimes referred to as sliders) that include read elements and write elements. A suspension arm holds the recording head above a magnetic disk. When the magnetic disk rotates, an air flow generated by the rotation of the magnetic disk causes an air bearing surface (ABS) side of the recording head to ride a particular height above the magnetic disk. The height depends on the shape of the ABS, disk spinning speed, pressure, and other variables. As the recording head rides on the air bearing, an actuator moves an actuator/suspension arm to position the read element and the write element over selected tracks of the magnetic disk.

On a conventional disk, the magnetic surface of the disk is continuous. Binary information is recorded on the disk by polarizing a unit (called a bit) of the disk to be one polarity (1) or the opposite polarity (0). The smaller the bit, the more information can be stored in a given area. Present magnetic recording may achieve a unit as small as 18×80 nanometers. Each bit includes multiple magnetic grains, and the typical grain size is about 6 nanometers. Therefore, in a bit of size 18×80 nanometers, there are about 40 grains.

To increase the areal density of the magnetic disk, the bit size is reduced. If the grain sizes are kept the same for smaller bit sizes, then there would be a smaller number of grains in a bit resulting in smaller signal-to-noise ratio (SNR). If the grain sizes are reduced proportionally to keep the number of grains in a bit constant for smaller bit sizes, then the SNR would be the same. However, the super-paramagnetic effect may cause problems when grain sizes are reduced. The super-paramagnetic effect occurs when the magnetic grains on the disk become so tiny that ambient temperature can reverse their magnetic orientations. The result is that the bit is erased and the data is lost.

One solution to the problems posed by the super-paramagnetic effect is to pattern the magnetic disk. A patterned disk is created as an ordered array of highly uniform islands, with each island capable of storing an individual bit. Within each island, the magnetic materials are strongly coupled so that an island behaves as a single domain, in contrast to multiple domains in the continuous media. Because an individual magnetic domain is as large as an island, the patterned disk is thermally stable and higher densities may be achieved.

When data recording is performed on a magnetic disk, the read head and write head are positioned over the tracks based on a Positioning Error Signal (PES) that is read from servo regions on the disk. The servo regions include patterns that are used to guide the read and write elements to the proper position on the disk. The regions where the actual data is stored are referred to herein as the data regions.

There are problems encountered when fabricating patterned media. In data regions, the islands of the patterned media should be uniformly spaced with very tight distribution. The precise locations and sizes of the islands are important to the SNR and the Bit Error Rate (BER) of the data recording process. Also, to increase the areal density of the disk, the spacing and size of the islands have to be small which is challenging for the fabrication process as the requirements may be beyond the limits of the lithographic capabilities.

By contrast, the islands in the servo regions are typically larger in size than the data regions. Larger islands in a sync field of the servo region advantageously lead to larger magnetic amplitudes when read by a read element which can provide a more accurate determination of amplitude and timing in the positioning signal.

Another difference between the data regions and the servo regions is that the islands of the data region need to be uniformly spaced, whereas the islands in the servo regions are staggered with empty space in between. The arrangement of the servo region is as such to provide a sensitive PES. Servo regions may have complex patterns, may have open areas, and may tolerate the size and shape fluctuations of individual islands. The data regions on the other hand have a single regular pattern, and require highly uniform island arrangement in both the position and sizes.

One promising approach to improve the tolerance of the island locations and sizes is to grow self-assembly structures on top of the lithographically-defined template. Then the location and size tolerance will be improved to the level limited by the molecular mono-dispersity of the self-assembly molecules. Self-assembly structures are most stable on regular lattices, such as hexagonal close packed (HCP). A regular lattice is good for the data regions. However, in servo regions, the complex servo patterns do not necessarily conform easily to HCP or other simple lattices.

Patterned media is typically fabricated using nanoimprint lithography (NIL). Nanoimprint lithography is a high-throughput method for imprinting nanometer-scale patterns on a substrate. To imprint the nanometer-scale patterns on a substrate, a master template is first fabricated. The master template is not typically used for imprinting an actual substrate as it can be quickly worn out when a large number of imprints are needed. The master template is expensive and time consuming to fabricate, so the master template is rather used to fabricate a plurality of stamper tools. The stamper tools are then used for imprinting the substrates to fabricate the patterned media.

To fabricate a stamper tool, the master template is pressed into a layer of polymer stamper resist material to imprint the inverse pattern of the master template in the stamper resist material. Heat or ultraviolet (UV) irradiation may then be applied to the stamper resist material to harden the stamper resist material in the inverse pattern of the master template. The master template is then removed from the stamper resist material leaving a stamper tool having a desired pattern. The stamper tool may then be used to imprint a plurality of substrates that will form patterned media.

To imprint a substrate, the stamper tool is pressed against a thin layer of replica resist material deposited on the substrate to imprint the inverse pattern of the stamper tool in the replica resist material. The stamper tool is then removed from the replica resist material leaving a substrate with a desired resist pattern covering the substrate. An etching process, such as Reactive Ion Etching (RIE), may then be performed to pattern the substrate according to the resist pattern. A similar process is performed to pattern many substrates using the stamper tool.

The master template is thus fabricated to have a desired servo pattern and a desired data pattern so that these patterns may be transferred to a substrate to form a patterned magnetic media. It remains a problem to define the servo pattern and the data pattern on the master template, as these patterns do not conform to the same island size, shape, and distribution.

SUMMARY OF THE SOLUTION

Embodiments of the invention solve the above and other related problems by using a lithographic process to define a servo pattern in the servo regions, and to define a data pattern in the data regions. The servo regions are then covered, and the data pattern is transferred to the data regions. Self-assembly structures are then built on the data pattern in the data regions to define a self-assembly pattern in the data regions. The self-assembly pattern is more uniform and precise than the data pattern formed through lithographic processes. Thus, by building self-assembly structures in the data regions, the islands of the data regions may be patterned in a uniform manner with precise locations and sizes. By using a lithographic process in the servo regions, the islands of the servo regions may be patterned to be larger in size and staggered in the desired fashion. Also, the servo pattern and the data pattern are defined in the same lithographic process, so there is a precise registration between the servo regions and the data regions.

One embodiment of the invention comprises a method of defining servo patterns and data patterns for a patterned magnetic media. To start, a lithographic process is performed to define a servo pattern in servo regions on a substrate. The lithographic process also defines a first data pattern in data regions of the substrate. The first data pattern is then transferred to (i.e., etched into) a shallow surface layer of the data regions. When the first data pattern is transferred to the data regions, a protective layer may be formed over the servo regions so that the servo pattern is not transferred at this time. Self-assembly structures are then formed on the first data pattern in the data regions to define a second data pattern. The top surface of the data regions has chemical or topographic contrast with the self-assembly structures, so the self-assembly structures assemble themselves in a uniform manner on the first data pattern and thus "fix" non-uniformities in the first data pattern. The servo pattern is then transferred to the servo regions and the second data pattern is transferred to the data regions. Thus, the servo pattern is defined through lithographic processes while the data pattern is defined by a combination of lithographic processes and self-assembly. The data pattern may be formed in the desired uniform fashion (i.e., HCP ordering) with self-assembly while the servo pattern may be formed in a more non-uniform fashion with lithography.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-28 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
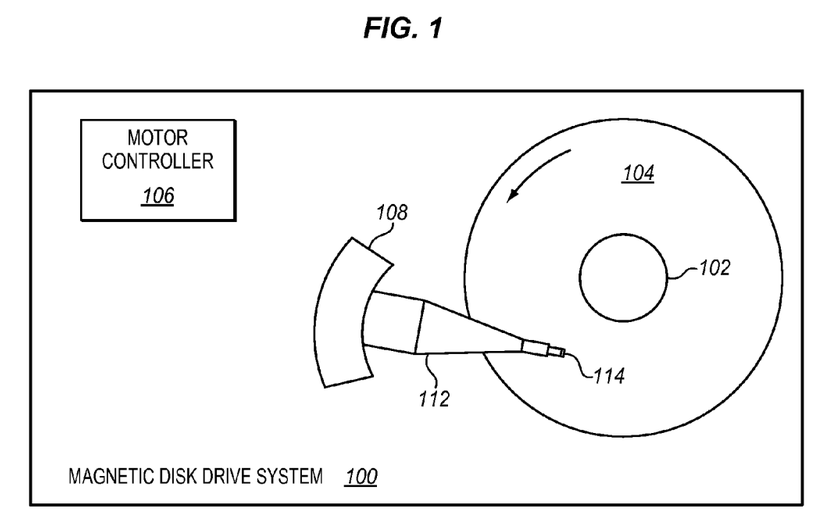
FIG. 1 illustrates a magnetic disk drive system.

FIG. 1 illustrates a magnetic disk drive system 100. Magnetic disk drive system 100 includes a spindle 102, a magnetic recording disk 104, a motor controller 106, an actuator 108, an actuator/suspension arm 112, and a recording head 114. Spindle 102 supports and rotates magnetic recording disk 104 in the direction indicated by the arrow. A spindle motor (not shown) rotates spindle 102 according to control signals from motor controller 106. Recording head 114 is supported by actuator/suspension arm 112. Actuator/suspension arm 112 is connected to actuator 108 that is configured to rotate in order to position recording head 114 over a desired track of magnetic recording disk 104. Magnetic disk drive system 100 may include other devices, components, or systems not shown in FIG. 1. For instance, a plurality of magnetic disks, actuators, actuator/suspension arms, and recording heads may be used.

When magnetic recording disk 104 rotates, an air flow generated by the rotation of magnetic disk 104 causes an air bearing surface (ABS) of recording head 114 to ride on a cushion of air at a particular height above magnetic disk 104. The height depends on the shape of the ABS. As recording head 114 rides on the cushion of air, actuator 108 moves actuator/suspension arm 112 to position a read element (not shown) and a write element (not shown) in recording head 114 over selected tracks of magnetic recording disk 104.

Figure 2:
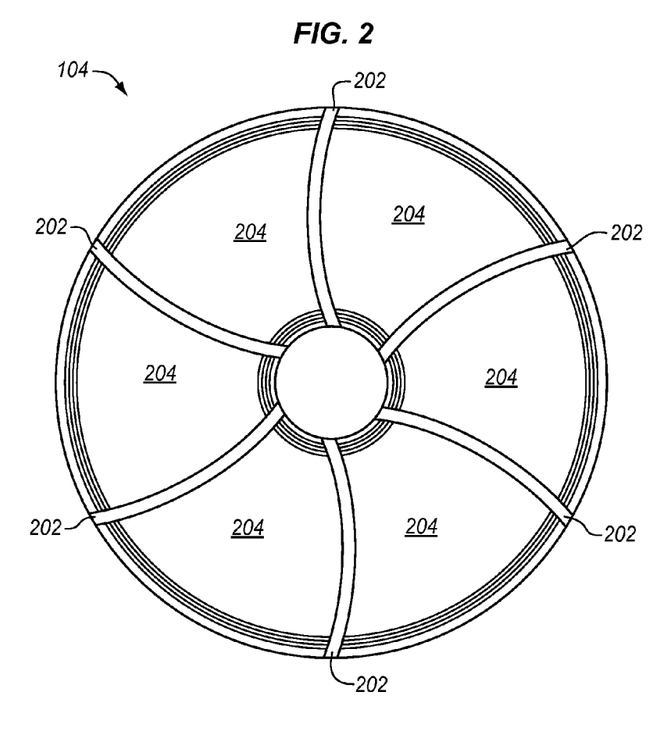
FIG. 2 is a top view of a magnetic recording disk.

FIG. 2 is a top view of magnetic recording disk 104. Magnetic recording disk 104 may be fabricated for perpendicular recording or longitudinal recording. Magnetic recording disk 104 has a plurality of servo regions 202 and a plurality of data regions 204. Data regions 204 are patterned in a desired manner to define a plurality of concentric tracks. Servo regions 202 are patterned in a desired manner in order to provide positional signals to precisely position a recording head over the tracks in data regions 204.

Figure 3:
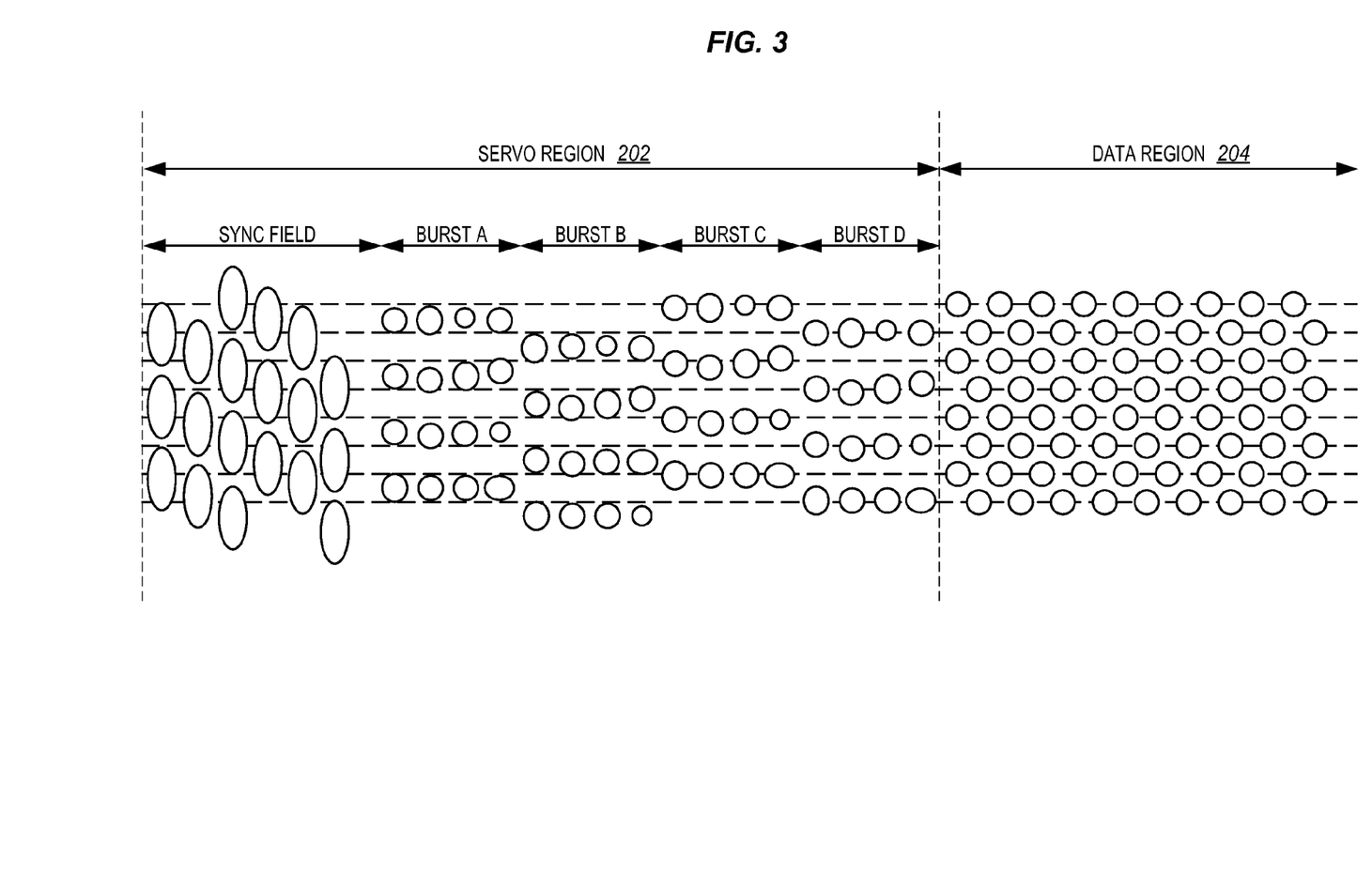
FIG. 3 illustrates exemplary patterns in servo regions and data regions of a magnetic recording disk.

FIG. 3 illustrates exemplary patterns of servo regions 202 and data regions 204. Servo regions 202 may each include a sync field and plurality of burst fields (A-D). The horizontal dotted lines in FIG. 3 illustrate data tracks of magnetic recording disk 104. The islands in the sync field and the burst fields may be larger in size and have a non-uniform shape. Conversely, the islands in data regions 204 should have a uniform size, a uniform shape, and should be precisely defined along a track. The islands in data regions 204 are in an array resembling an HCP structure. There may be other servo patterns which have complex structures which are also not suitable for self-assembly structures.

Figure 4:
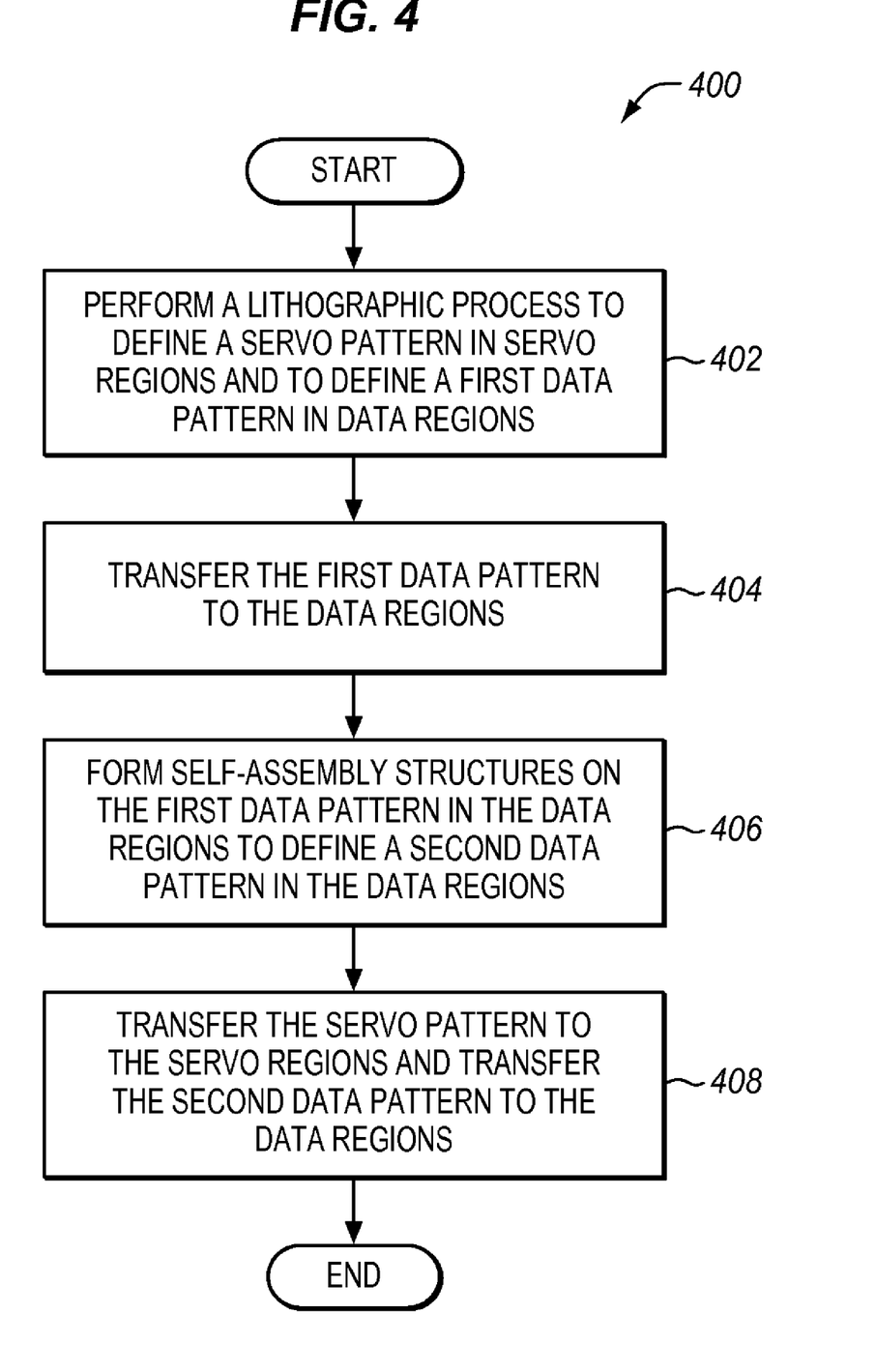
FIG. 4 is a flow chart illustrating a method of defining servo patterns and data patterns for a patterned magnetic media in an exemplary embodiment of the invention.

As previously stated, it is a problem to pattern a magnetic media, such as magnetic recording disk 104, so that the islands in data regions 204 have a uniform pattern while servo regions 202 have non-uniform patterns. FIG. 4 describes a method of defining servo patterns and data patterns for a patterned magnetic media, which effectively allows for the different patterns of data regions 204 and servo regions 202.

FIG. 4 is a flow chart illustrating a method 400 of defining servo patterns and data patterns for a patterned magnetic media in an exemplary embodiment of the invention. Method 400 is illustrated as fabricating a master template. FIGS. 5-8 are cross-sectional views of a master template 500 being fabricated according to method 400. Master template 500 may be used to imprint a substrate to fabricate a patterned magnetic media, or may be used to form one or more stamper tools that imprint the substrate to fabricate the patterned magnetic media. Method 400 may also be used to pattern a substrate of a patterned magnetic media directly, which is independent from fabricating a master template.

Figure 5:
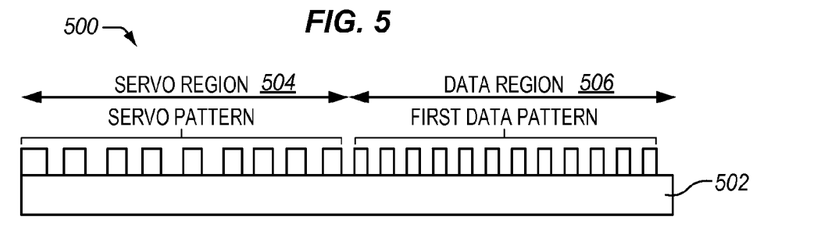
FIGS. 5-9 are cross-sectional views of a master template being fabricated according to the method of FIG. 4 in an exemplary embodiment of the invention.

Step 402 comprises performing a lithographic process to define a servo pattern in servo regions 504 on a substrate 502 (see FIG. 5). The lithographic process in step 402 also defines a first data pattern in data regions 506 of substrate 502. FIG. 5 is a cross-sectional view of master template 500 with the servo pattern and the first data pattern defined according to step 402. The portion of substrate 502 that is shown in FIG. 5 illustrates a servo region 504 and a data region 506, although a subsequently formed master template 500 will include multiple servo regions 504 and data regions 506. Those skilled in the art will appreciate that the lithographic process in step 402 is used to pattern a photoresist that is deposited on substrate 502. Substrate 502 may have a surface or top coating (not shown) of a seed layer to alter surface chemistry of substrate 502, such as to attract self-assembly materials.

The first data pattern defined in the lithographic process is not precise enough to uniformly pattern data regions 506. Thus, the first data pattern is the pattern upon which self-assembly structures will be built in following steps. However, the lithographic process is precise enough to pattern servo regions 504 in a desired manner, and thus self-assembly structures are not used in servo regions 504.

Figure 6:
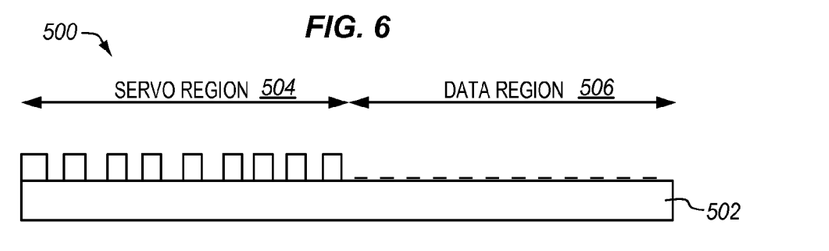

Step 404 of method 400 comprises transferring the first data pattern to a shallow surface layer of data regions 506. FIG. 6 is a cross-sectional view of master template 500 with the first data pattern transferred in data regions 506 according to step 404. Transferring the first data pattern may comprise etching the first data pattern into a top surface of substrate 502 in data regions 506 so that self-assembly structures may be formed on the first data pattern. When step 404 is performed, a protective layer (not shown) may be formed over servo regions 504 so that the servo pattern is not transferred at this time, which is illustrated in subsequent embodiments.

Figure 7:
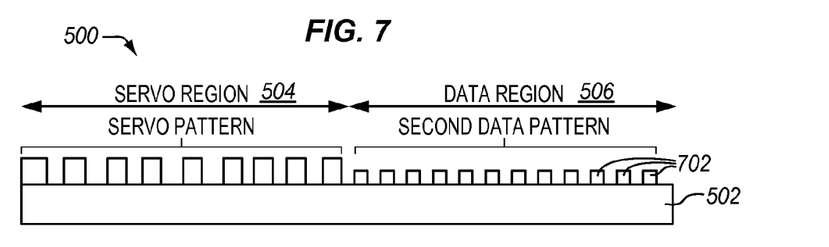

Step 406 comprises forming self-assembly structures 702, such as from di-block polymers, on the first data pattern in data regions 506 (see FIG. 7). FIG. 7 is a cross-sectional view of master template 500 with self-assembly structures 702 formed on the first data pattern according to step 406. The top surface of substrate 502 has chemical or topographic contrast with self-assembly structures 702. Due to their inherent properties, self-assembly structures 702 uniformly build upon the first data pattern and thus "fix" non-uniformities in the first data pattern by assembling themselves in a uniform manner. The precise and uniform pattern formed by self-assembly structures 702 defines a second data pattern (also referred to as a self-assembly pattern) in data regions 506. Those skilled in the art may use different methods of forming self-assembly structures 702. Also, those skilled in the art will appreciate that the first data pattern and the second data pattern may be different. There may not necessarily be one-to-one correlation of features in the first data pattern and the second data pattern. The first data pattern is used as a guide for forming the self-assembly structures 702 that are used to define the second data pattern.

Figure 8:
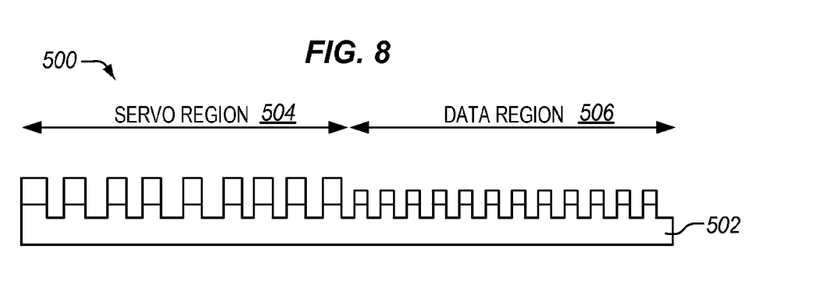
Figure 9:
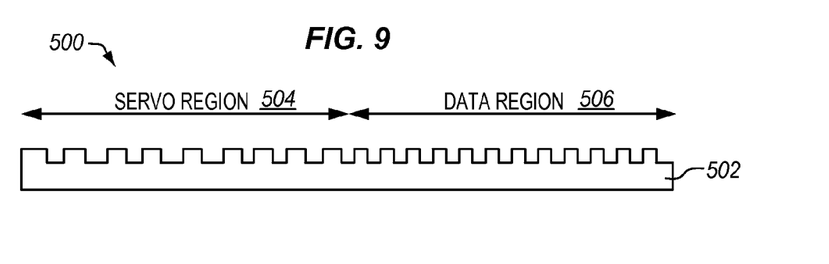

Step 408 comprises transferring the servo pattern to the servo regions 504 and transferring the second data pattern to the data regions 506. FIG. 8 is a cross-sectional view of master template 500 with the servo pattern transferred and the second data pattern transferred according to step 408. In transferring the servo pattern, an etching process may be performed to etch around the photoresist defined in the initial lithographic process. The etching process etches the servo pattern into substrate 502 in servo regions 504. In transferring the second data pattern, the same or another etching process may be performed to etch around the self-assembly structures 702 (see FIG. 7). The etching process etches the second data pattern into substrate 502 in data regions 506. Any desired etching or removal process may be employed in step 408. The photoresists and self-assembly structures may then be removed leaving the master template 500 having the desired pattern in servo regions 504 and data regions 506. FIG. 9 is a cross-sectional view of master template 500 with the desired patterns.

In step 408, the servo pattern and the second data pattern may be transferred in the same or similar etching process. However, it may be desirable to transfer the servo pattern and the second data pattern separately. For instance, different etch rates may be used, different etch depths may be used, etc. To transfer the patterns separately, the servo regions may be covered with a protective layer while the second data pattern is transferred to the data regions 506. The servo regions may then be uncovered, and the data regions may be covered with a protective layer while the servo pattern is transferred to the servo regions 504.

Method 400 and variations thereof advantageously provide an effective way of defining different patterns in servo regions 504 and data regions 506. Also, the servo pattern and the first data pattern are defined in the same lithographic process, so there is a precise registration between the servo regions 504 and the data regions 506.

Figure 10:
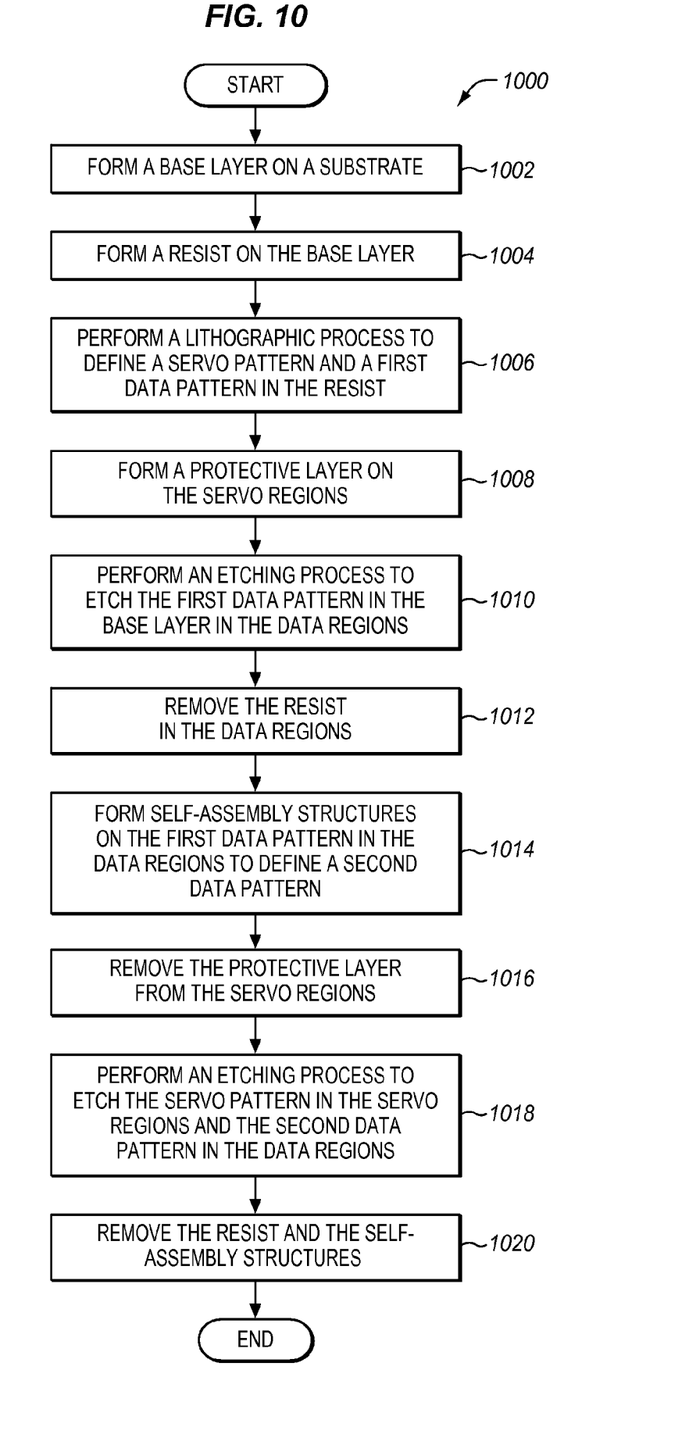
FIG. 10 is a flow chart illustrating a more detailed method of defining servo patterns and data patterns for a patterned magnetic media in an exemplary embodiment of the invention.

FIG. 10 is a flow chart illustrating a more detailed method 1000 of defining servo patterns and data patterns for a patterned magnetic media in an exemplary embodiment of the invention. Method 1000 is illustrated as fabricating a master template. FIG. 10 illustrates just one embodiment, and variations of method 1000 may be used to fabricate master templates as described herein. FIGS. 11-21 are cross-sectional views of a master template 1100 being fabricated according to method 1000.

Figure 11:
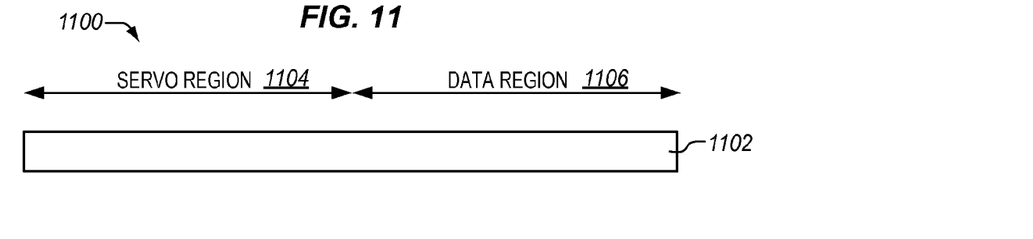
FIGS. 11-21 are cross-sectional views of a master template being fabricated according to the method of FIG. 10 in an exemplary embodiment of the invention.

FIG. 11 is a cross-sectional view of master template 1100 during fabrication that includes a substrate 1102. The portion of substrate 1102 that is shown illustrates a servo region 1104 and a data region 1106 although a subsequently formed master template will include multiple servo regions 1104 and data regions 1106.

Figure 12:
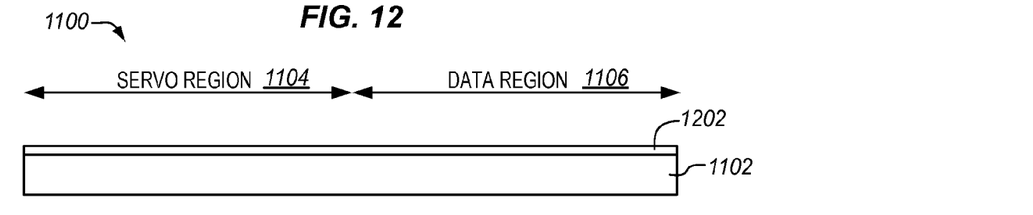
Figure 13:
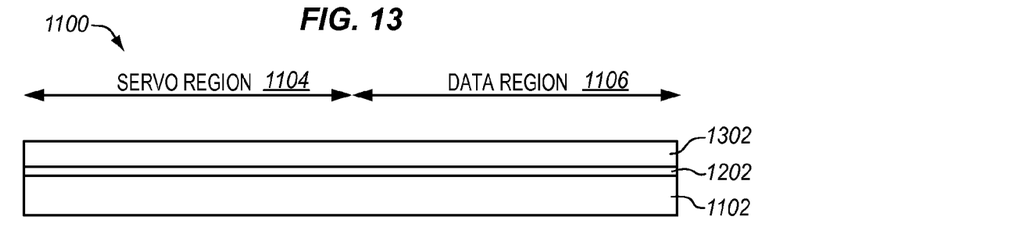
Figure 14:
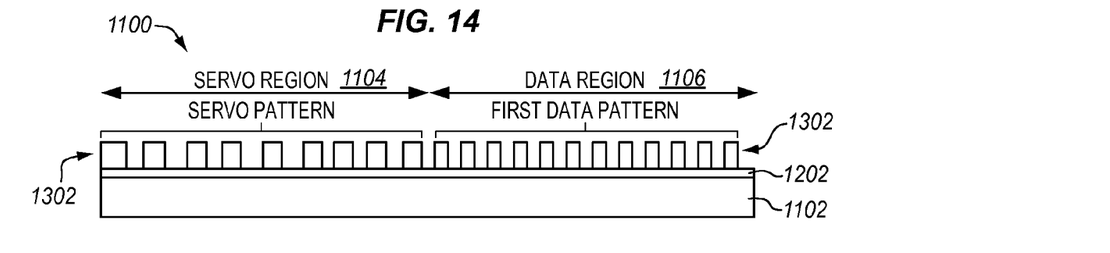

Step 1002 of method 1000 comprises forming or depositing a base layer 1202 on substrate 1102 (see FIG. 12). FIG. 12 is a cross-sectional view of master template 1100 with base layer 1202 formed according to step 1002. Base layer 1202 is formed from a material that attracts self-assembly materials, such as polymers or monomers. Step 1004 comprises forming or depositing a photoresist 1302 on base layer 1202 (see FIG. 13). FIG. 13 is a cross-sectional view of master template 1100 with resist 1302 formed according to step 1004. Step 1006 comprises performing a lithographic process, such as electron beam lithography, to define a servo pattern in resist 1302 in servo regions 1104 (see FIG. 14). The lithographic process in step 1006 also defines a first data pattern in resist 1302 in data regions 1106. FIG. 14 is a cross-sectional view of master template 1100 with resist 1302 patterned according to step 1006. The first data pattern defined in the lithographic process is not precise enough to uniformly pattern data regions 1106. Thus, the first data pattern is the pattern upon which self-assembly structures will be built in following steps. However, the lithographic process is precise enough to pattern servo regions 1104 in a desired manner, and thus self-assembly structures are not used in servo regions 1104.

Figure 15:
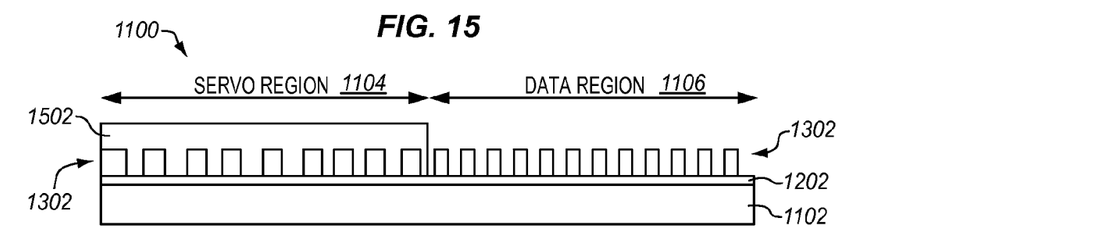
Figure 16:
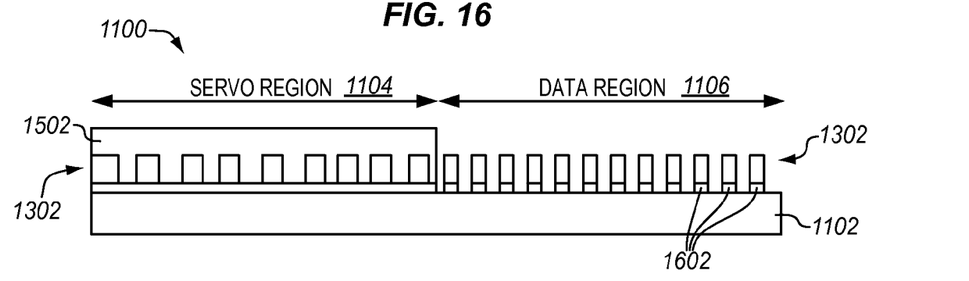
Figure 17:
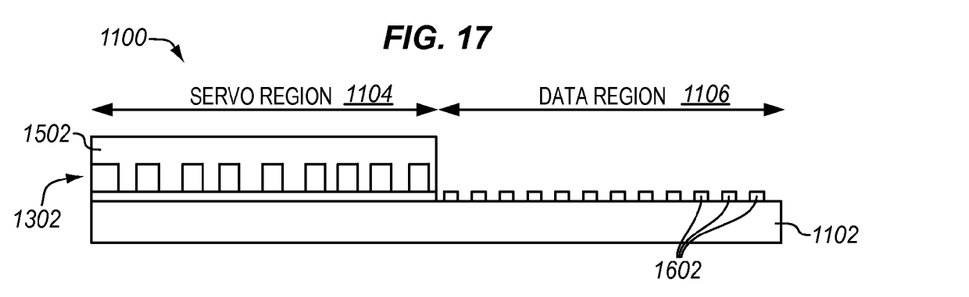

Step 1008 comprises forming a protective layer 1502 on resist 1302 in servo regions 1104 (see FIG. 15). FIG. 15 is a cross-sectional view of master template 1100 with protective layer 1502 formed according to step 1008. Protective layer 1502 comprises any type of protective material that covers and protects servo regions 1104, such as a diamond-like carbon (DLC) material. Step 1010 comprises performing an etching process to etch the first data pattern in base layer 1202 in data regions 1106. For example, an etching process, such as Reactive Ion Etching (RIE), may be performed to etch the portions of base layer 1202 exposed by resist 1302. FIG. 16 is a cross-sectional view of master template 1100 after the etching process according to step 1010. The etching process transfers the first data pattern 1602 to base layer 1202. Step 1012 comprises removing resist 1302 in data regions 1106 (see FIG. 17). FIG. 17 is a cross-sectional view of master template 1100 with resist 1302 removed in data regions 1106 according to step 1012. After resist 1302 is removed, the first data pattern 1602 remains in data regions 1106.

Figure 18:
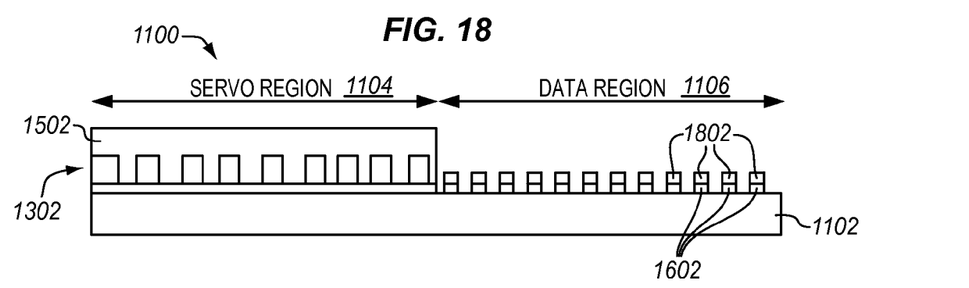

Step 1014 comprises forming self-assembly structures 1802, such as from di-block polymers, on the first data pattern 1602 in data regions 1106 (see FIG. 18). FIG. 18 is a cross-sectional view of master template 1100 with self-assembly structures 1802 formed according to step 1014. Those skilled in the art may use different methods of forming self-assembly structures 1802. Due to their inherent properties, self-assembly structures 1802 uniformly build upon the first data pattern 1602 that is etched in data regions 1106. Self-assembly structures 1802 thus "fix" non-uniformities in the first data pattern 1602 by assembling themselves in a uniform manner. The precise and uniform pattern formed by self-assembly structures 1802 defines a second data pattern in data regions 1106. Again, those skilled in the art will appreciate that the first data pattern and the second data pattern may be different, as the first data pattern is used as a guide for forming the self-assembly structures 1802 that are used to define the second data pattern.

Figure 19:
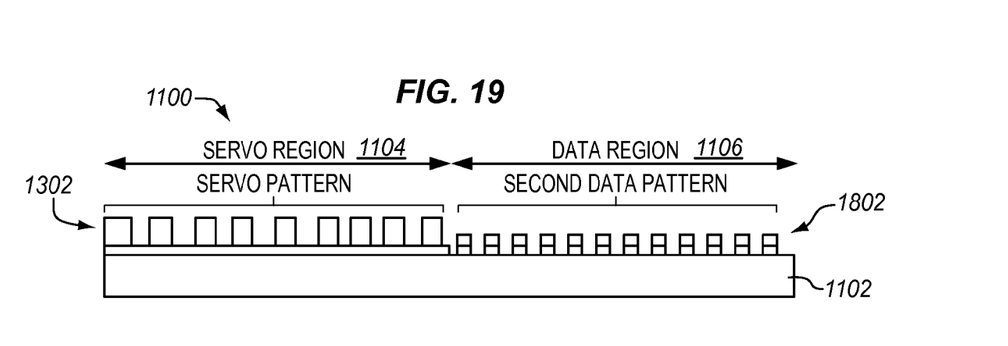
Figure 20:
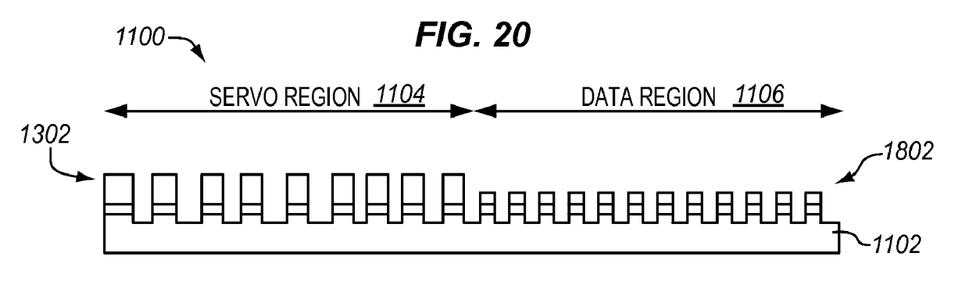
Figure 21:
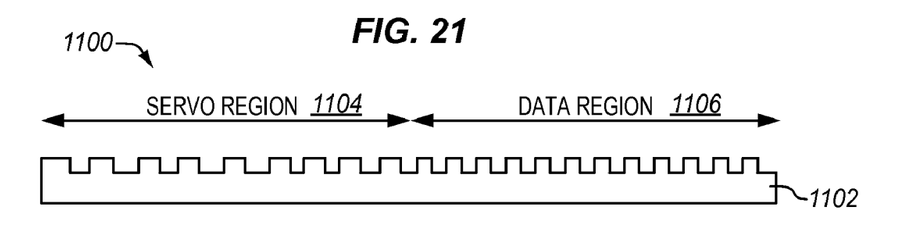

Step 1016 comprises removing protective layer 1502 on resist 1302 in servo regions 1104 (see FIG. 19). FIG. 19 is a cross-sectional view of master template 1100 with protective layer 1502 removed according to step 1016. Step 1018 comprises performing an etching process to etch the servo pattern in servo regions 1104 based on the servo pattern defined in resist 1302 (see FIG. 20). Step 1018 further comprises performing an etching process to etch the second data pattern in data regions 1106 based on the self-assembly structures 1802 (see FIG. 20). FIG. 20 is a cross-sectional view of master template 1100 after the etching process according to step 1018. Any desired etching or removal process may be employed in step 1018. Step 1020 comprises removing resist 1302 and self-assembly structures 1802 (see FIG. 21). FIG. 21 is a cross-sectional view of master template 1100 with resist 1302 and self-assembly structures 1802 removed according to step 1020. Master template 1100 may then be used to imprint magnetic disks with the desired patterns.

Method 1000 may have multiple variations to achieve similar results. According to method 1000, servo regions 1104 are patterned with a lithographically defined resist 1302. The lithographically-defined resist 1302 (see FIG. 14) allows fabricators to define the non-uniform island sizes, shapes, and locations that are desired in servo regions 1104. Data regions 1106 are patterned with self-assembly structures 1802 as opposed to a lithographically-defined resist. The self-assembly materials allow fabricators to define uniform islands in data regions 1106 that are tightly-packed. To form self-assembly structures 1802, servo regions 1104 are masked with protective layer 1502 so that the self-assembly structures 1802 are not built in servo regions 1104. With servo regions 1104 protected, self-assembly structures 1802 may then be built in data regions 1106. After self-assembly structures 1802 are formed in data regions 1106, protective layer 1502 may be removed, and data regions 1106 are patterned based on self-assembly structures 1802 and servo regions 1104 are patterned based on resist 1302.

Figure 22:
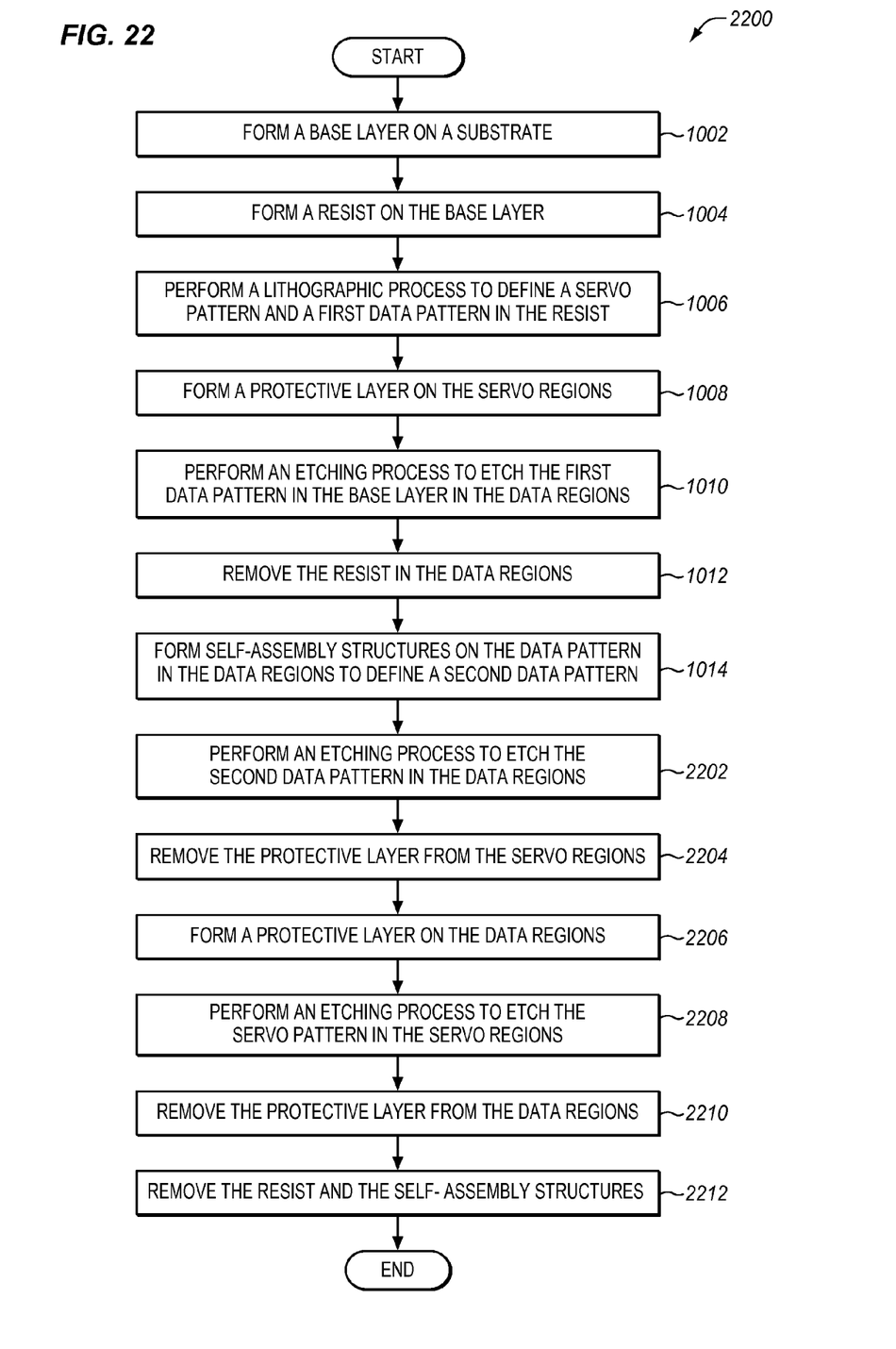
FIG. 22 is a flow chart illustrating another method of defining servo patterns and data patterns for a patterned magnetic media in an exemplary embodiment of the invention.

In the above embodiment, servo regions 1104 and data regions 1106 are etched in the same processing step (step 1018). In other embodiments, servo regions 1104 and data regions 1106 may be etched in separate processing steps. FIG. 22 is a flow chart illustrating another method 2200 of defining servo patterns and data patterns for a patterned magnetic media in an exemplary embodiment of the invention. Method 2200 has steps (1002-1014) that are similar to method 1000 (see FIG. 10), which have the same reference number. These steps will not be described again for the sake of brevity.

Figure 23:
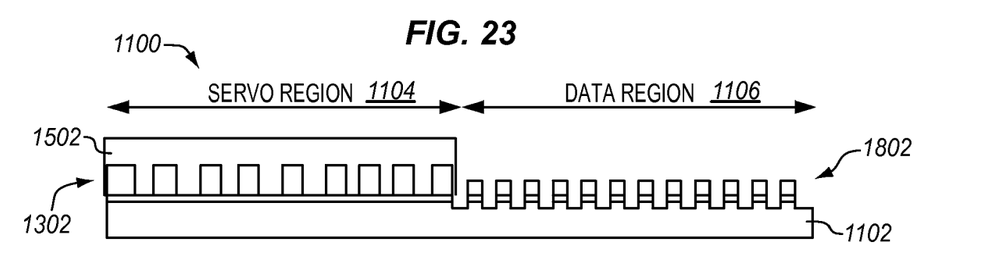
FIGS. 23-28 are cross-sectional views of a master template being fabricated according to the method of FIG. 22 in an exemplary embodiment of the invention.
Figure 24:
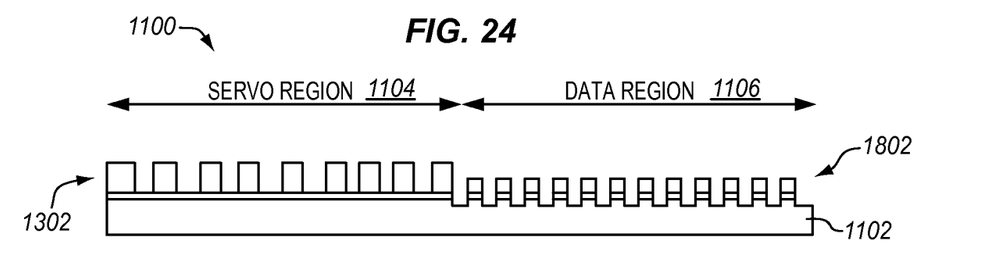

After the self-assembly structures 1802 (see FIG. 18) are formed in step 1014, the protective layer 1502 on resist 1302 in servo regions 1104 is not removed as in method 1000 (see FIG. 10) in this embodiment. With protective layer 1502 remaining on servo regions 1104, step 2202 of method 2200 comprises performing an etching process to etch the second data pattern in data regions 1106 based on the self-assembly structures 1802 (see FIG. 23). FIG. 23 is a cross-sectional view of master template 1100 after the etching process according to step 2202. Step 2204 comprises removing protective layer 1502 on resist 1302 in servo regions 1104 (see FIG. 24). FIG. 24 is a cross-sectional view of master template 1100 with protective layer 1502 removed according to step 2204.

Figure 25:
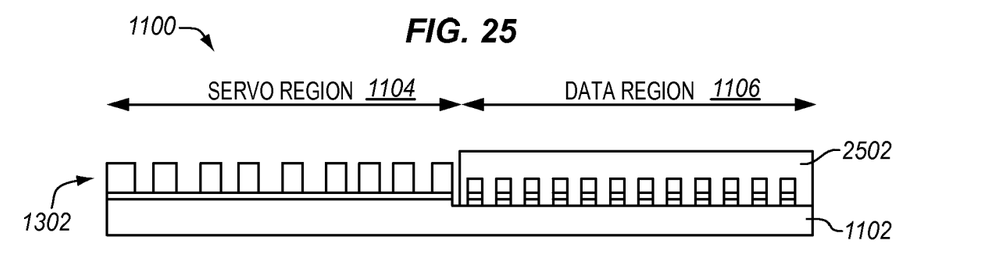
Figure 26:
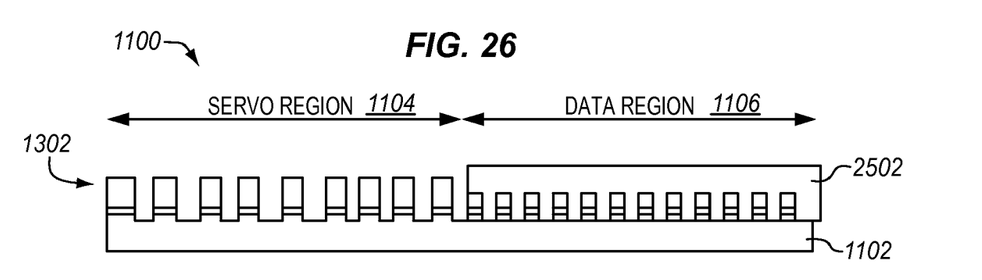
Figure 27:
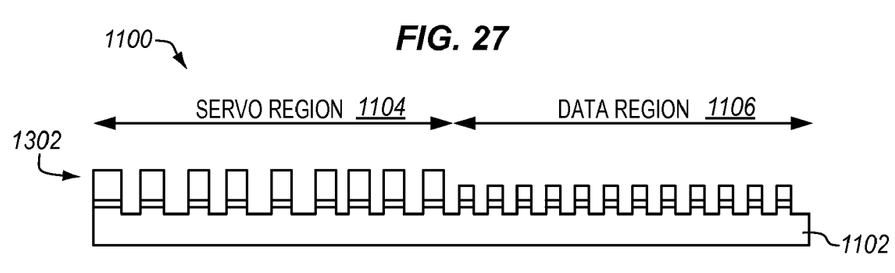

Step 2206 comprises forming a protective layer 2502 in data regions 1106 (see FIG. 25). FIG. 25 is a cross-sectional view of master template 1100 with protective layer 2502 formed according to step 2206. Protective layer 2502 may again comprise any type of protective material that covers and protects data regions 1106, and can later be selectively removed without removing or damaging the underlying servo patterns. Examples of materials that can be selectively removed would include metals such as aluminum or chromium. With data regions 1106 protected, step 2208 comprises performing an etching process to etch the servo pattern in servo regions 1104 based on the servo pattern defined in resist 1302 (see FIG. 26). FIG. 26 is a cross-sectional view of master template 1100 after the etching process according to step 2208. Step 2210 comprises removing protective layer 2502 in data regions 1106 (see FIG. 27). FIG. 27 is a cross-sectional view of master template 1100 with protective layer 2502 removed according to step 2210.

Figure 28:
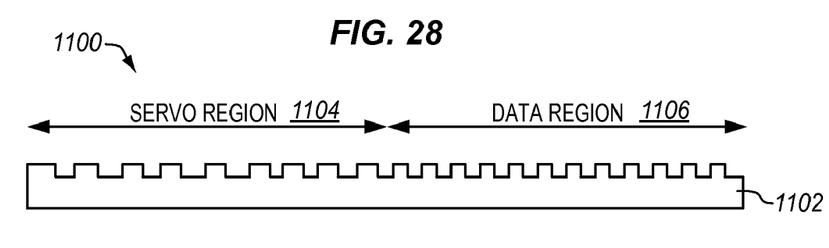

Step 2212 comprises removing resist 1302 and self-assembly structures 1802 (see FIG. 28). FIG. 28 is a cross-sectional view of master template 1100 with resist 1302 and self-assembly structures 1802 removed according to step 2212. Master template 1100 may then be used to imprint magnetic disks with the desired patterns.

The above embodiments illustrate methods of fabricating master templates which are used to fabricate patterned magnetic media. Those skilled in the art will appreciate that similar methods may be used to pattern a magnetic media directly.

Although specific embodiments were described herein, the scope of the invention is not limited to those specific embodiments. The scope of the invention is defined by the following claims and any equivalents thereof.

We claim:

1. A method of defining servo patterns and data patterns for a patterned magnetic media, the method comprising:
    performing a lithographic process to define a servo pattern in servo regions, and to define a first data pattern in data regions;
    transferring the first data pattern to the data regions;
    forming self-assembly structures on the first data pattern in the data regions to define a second data pattern in the data regions;
    transferring the servo pattern to the servo regions; and
    transferring the second data pattern to the data regions.

2. The method of claim 1 wherein performing a lithographic process to define a servo pattern in servo regions, and to define a first data pattern in data regions comprises:
    depositing a base layer on a substrate;
    depositing a resist on the base layer; and
    patterning the resist with the lithographic process to define the servo pattern in the servo regions, and to define the first data pattern in the data regions.

3. The method of claim 2 wherein transferring the first data pattern to the data regions comprises:
    forming a protective layer on the servo regions;
    performing an etching process to etch the first data pattern into the base layer in the data regions; and
    removing the resist in the data regions.

4. The method of claim 3 wherein transferring the servo pattern to the servo regions and transferring the second data pattern to the data regions comprises:
    removing the protective layer on the servo regions; and
    performing an etching process to etch the servo pattern into the servo regions and to etch the second data pattern into the data regions.

5. The method of claim 3 wherein transferring the second data pattern to the data regions comprises:
    performing a first etching process to etch the second data pattern into the data regions.

6. The method of claim 5 wherein transferring the servo pattern to the servo regions comprises:
    removing the protective layer on the servo regions;
    forming a protective layer on the data regions; and
    performing a second etching process to etch the servo pattern into the servo regions.

7. A method of defining servo patterns and data patterns for a patterned magnetic media, the method comprising:
    depositing a base layer on a substrate;
    depositing a resist on the base layer;
    performing a lithographic process to define a servo pattern in servo regions and to define a first data pattern in data regions;
    forming a protective layer on the servo regions;
    performing a first etching process to etch the first data pattern into the base layer in the data regions;
    removing the resist in the data regions; and
    forming self-assembly structures on the first data pattern in the data regions to define a second data pattern.

8. The method of claim 7 further comprising:
    removing the protective layer from the servo regions;
    performing a second etching process to etch the servo pattern into the servo regions and to etch the second data pattern into the data regions; and
    removing the resist in the servo regions and the self-assembly structures in the data regions.

9. The method of claim 7 further comprising:
    performing a second etching process to etch the second data pattern into the data regions.

10. The method of claim 9 further comprising:
    removing the protective layer on the servo regions;
    forming a protective layer on the data regions;
    performing a third etching process to etch the servo pattern into the servo regions; and
    removing the resist in the servo regions and the self-assembly structures in the data regions.

11. The method of claim 7 wherein the base layer comprises a self-assembly monomer.

12. The method of claim 7 wherein the protective layer comprises one of aluminum or chromium.

13. A method of defining servo patterns and data patterns for a patterned magnetic media, the method comprising:
    patterning a resist in servo regions and data regions;
    forming a protective layer over the resist in the servo regions;
    etching around the resist in the data regions to form a first data pattern in the data regions;
    removing the resist in the data regions;
    forming self-assembly structures on the first data pattern in the data regions;
    removing the protective layer over the resist in the servo regions; and
    performing an etching process around the resist in the servo regions to define a servo pattern and around the self-assembly structures in the data regions to define a second data pattern.

14. The method of claim 13 further comprising:
    removing the resist from the servo regions; and
    removing the self-assembly structures from the data regions.

15. The method of claim 13 wherein the protective layer comprises one of aluminum or chromium.

16. A method of fabricating a master template, the method comprising:
    forming a first resist pattern in servo regions;
    forming a protective layer over the first resist pattern in the servo regions; and forming a second resist pattern from self-assembly materials in data regions.

17. The method of claim 16 further comprising:
removing the protective layer; and
performing an etching process to pattern the servo regions based on the first resist pattern and to pattern the data regions based on the second resist pattern.

18. The method of claim 16 further comprising:
removing the first resist pattern and the second resist pattern.

19. The method of claim 16 wherein the protective layer comprises one of aluminum or chromium.

* * * * *

UNITED STATES PATENT AND TRADEMARK OFFICE
CERTIFICATE OF CORRECTION

| | | |
|---|---|---|
| PATENT NO. | : 7,969,686 B2 | Page 1 of 1 |
| APPLICATION NO. | : 11/964680 | |
| DATED | : June 28, 2011 | |
| INVENTOR(S) | : Albrecht et al. | |

It is certified that error appears in the above-identified patent and that said Letters Patent is hereby corrected as shown below:

In column 7, line 5, the text "abase" should read --a base--.

Signed and Sealed this
Eighteenth Day of October, 2011

David J. Kappos
*Director of the United States Patent and Trademark Office*